United States Patent [19]

Kumagai et al.

[11] Patent Number: 4,780,299

[45] Date of Patent: Oct. 25, 1988

[54] METHOD FOR PRODUCING ALUMINUM NITRIDE POWDER

[75] Inventors: Masato Kumagai; Yutaka Yoshii; Ryoji Uchimura, all of Chiba, Japan

[73] Assignee: Kawasaki Steel Corporation, Chiba, Japan

[21] Appl. No.: 123,874

[22] Filed: Nov. 23, 1987

[30] Foreign Application Priority Data

Nov. 28, 1986 [JP] Japan .................................. 61-283206
Feb. 19, 1987 [JP] Japan .................................. 62-036633

[51] Int. Cl.$^4$ ............................................ C01B 21/06
[52] U.S. Cl. ...................................................... 423/412
[58] Field of Search ........................................ 423/412

[56] References Cited

FOREIGN PATENT DOCUMENTS

| 183108 | 8/1986 | Japan .................................. 423/412 |
| 62-78103 | 4/1987 | Japan . |
| 62-100405 | 5/1987 | Japan . |
| 62-132710 | 6/1987 | Japan . |
| 62-167208 | 7/1987 | Japan . |
| 182164 | 8/1987 | Japan . |

Primary Examiner—John Doll
Assistant Examiner—Wayne A. Langel
Attorney, Agent, or Firm—Bierman and Muserlian

[57] ABSTRACT

A method for producing an aluminum nitride powder of superior sinterability of which steps are providing an aqueous boehmite sol having a pH of 1.2 to 4.5, mixing a carbon source material to the sol and drying the mixture. The mixture is sintered in a non-oxidizing atmosphere containing nitrogen or in a nitrogen atmosphere and finally decarbonized to obtain an aluminum nitride powder. The carbon source material is preferably a mixture of an organic carbon source material and a solid carbon powder. A predetermined amount of alpha-alumina may be added to the mixture.

10 Claims, 3 Drawing Sheets

METHOD FOR PRODUCING ALUMINUM NITRIDE POWDER

BACKGROUND OF THE INVENTION

1. Field of the Invention

This invention relates to the art of aluminum nitride and more particularly, to a method for producing aluminum nitride fine powder which is high in purity and has good sinterability.

2. Description of the Prior Art

Aluminum nitride is now expected to have wide utility in various fields including not only the field of high temperature heat-resistant materials based on good mechanical characteristics and chemical durability, but also the field of heat-radiating materials in the semiconductive art because of its high heat conductivity, good electric insulating property and low dielectric constant. In most cases, aluminum nitride has been employed as a sintered product although it may be utilized in the form of a thin film.

It is known that the sintering properties and characteristics of an aluminum nitride sintered product is greatly influenced by the characteristics of a starting aluminum nitride powder and the type and manner of sintering agent dispersed in the powder. More particularly, the aluminum nitride powder should be highly pure as well as fine and uniform in size. A suitable sintering agent should be uniformly dispersed in the aluminum nitride powder.

In general, an aluminum powder is produced by a direct nitriding method of metallic aluminum or a reducing and nitriding method of alumina. With the direct nitriding method, it is very difficult to obtain an aluminum nitride powder which is fine and uniform in size and has high purity. In addition, it is also difficult to uniformly disperse a sintering agent in the aluminum nitride powder. If, in the reducing and nitriding method, starting alumina used is fine, uniform and highly pure, it is more likely to obtain an aluminum nitride powder of a slightly better quality than in the case of the direct nitriding method. Nevertheless, such a powder is far from a desired powder.

Several improved methods of obtaining a highly pure and fine aluminum nitride powder with a uniform size have been proposed, for example, in Japanese Laid-open Patent Application No. 61-6105 and Japanese Patent Publication No. 61-2685. Such methods include a method which comprises water to a dispersion of aluminum alkoxide and carbon, causing the alkoxide to be hydrolyzed thereby containing a mixture of aluminum hydroxide and carbon, and a method in which an alkali is added to an aqueous solution containing a water-soluble aluminum salt and carbon to obtain a mixture of aluminum hydroxide and carbon by neutralizing precipitation.

The mixture obtained by these methods are more uniform than the mixture of alumina and carbon. When these mixtures are sintered in a non-oxidizing atmosphere containing nitrogen, there can be obtained an aluminum nitride powder which is more uniform and finer than the powder from the mixture of alumina and carbon.

However, these improved methods are also disadvantageous in that when water or an alkali is added for the hydrolysis or precipitation by neutralization, a precipitate is locally formed and immediately coagulates in situ. This results in formation of a number of aluminum hydroxide aggregates which are free of any carbon fine powder and have a size of not less than 1 micron. Accordingly, the resultant mixture of aluminum hydroxide and carbon is not satisfactory with respect to the uniformity. This leads to a tendency toward the irregularity in size of the aluminum nitride obtained by sintering the non-uniform mixture in a non-oxidizing atmosphere containing nitrogen. After sintering, the alumina is liable to remain non-nitrided with a high possibility of forming coarse grains of aluminum nitride having a size of from 1 to 5 microns.

SUMMARY OF THE INVENTION

It is therefore an object of the present invention to provide a method for producing aluminum nitride powder which is highly pure and fine in size and has good sinterability.

It is another object of the invention to provide a method for producing aluminum nitride powder by the use of a uniform dispersion of boehmite or pseudo boehmite and a carbon source material whereby a fine aluminum nitride powder can be obtained with a narrow distribution in size.

It is a further object of the invention to provide a method for producing aluminum nitride powder by the use of a specific type of carbon source material in the form of a mixture of a water-soluble organic carbon source and a solid carbon powder whereby the size distribution is more improved.

It is yet another object of the invention to provide a method for producing aluminum nitride powder in which an alpha-alumina powder is mixed with a mixture of a boehmite sol and a carbon source material, so that the resultant aluminum nitride powder has a further improved distribution in size with a reduced amount of carbon.

According to one embodiment of the present invention, there is provided a method for producing aluminum nitride powder which comprises adding a boehmite powder to an aqueous medium, adjusting the resulting dispersion to a pH of 1.2 to 4.5 to obtain a boehmite sol, mixing the boehmite sol with a carbon source material, drying the mixture, sintering the dried mixture in a non-oxidizing atmosphere containing a nitrogen gas, and decarbonizing the sintered product. In the above method, the drying may be effected after gelation of the mixture of the boehmite sol and the carbon source material.

In a preferred embodiment of the invention, the carbon source material used in the above method is a mixture of the carbon obtained from an organic carbon source material and a solid carbon powder at a mixing ratio by weight of from 0.05:1 to 0.5:1, and the mixing ratio by weight of the total of the carbon derived from the organic carbon source material and the solid carbon powder and the boehmite powder is in the range of from 0.4:1 to 3:1. The use of the different carbon sources is more effective in improving the nature of the aluminum nitride powder.

In both embodiments described above, it is preferable to further add a predetermined amount of alpha-alumina powder to the mixture of the boehmite sol and the carbon source material or materials in order to realize a narrow size distribution of a final aluminum nitride powder with a reduced amount of residual carbon in the powder. It will be noted that the term of "boehmite"

used herein is intended to mean not only boehmite, but also pseudo boehmite as will be described hereinafter.

DETAILED DESCRIPTION AND EMBODIMENTS OF THE INVENTION

Figure 1:
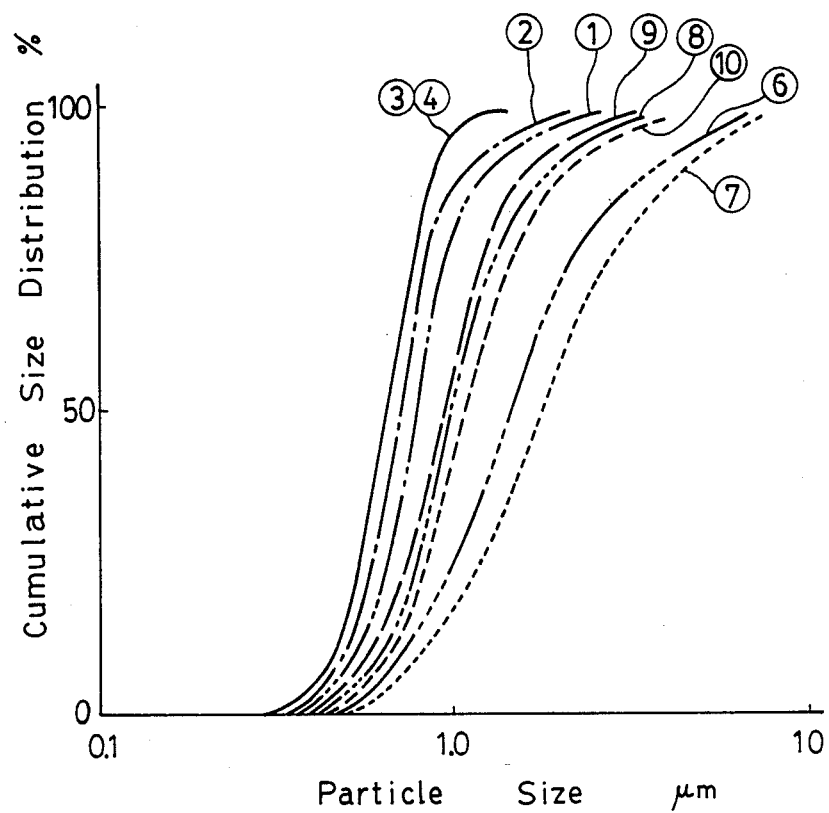
FIG. 1 is a graph showing the relation between a cumulative size distribution and a particle size for different aluminum nitride powders obtained under different conditions according to one embodiment of the invention and also under conditions for comparison.

The method according to a broad embodiment of the invention comprises the following steps.

(1) Boehmite or pseudo boehmite which is very readily dispersible in water is added to an aqueous medium such as water and is adjusted in pH to a range of 1.2 to 4.5, by which a boehmite sol in which the boehmite is stably dispersed is obtained. The particle size of the boehmite in the sol is not larger that 500 angstroms. The pseudo boehmite has an X-ray diffraction peak at the same position as boehmite crystals but the peak width is broader and the crystallinity is poorer than those of boehmite crystals. The dispersability of the pseudo boehmite in water is similar to the dispersability of the boehmite crystals.

(2) A fine powder of a carbon source material is added to the boehmite sol and uniformly mixed, and is solidified while keeping the uniform state of the mixture. Thereafter, the solidified mixture is dried and sintered in a non-oxidizing atmosphere containing nitrogen.

(3) In the above step (2), for the solidification of the mixture while keeping the uniform state of the dispersion of the boehmite sol and the carbon source material, the water is removed such as by evaporation, thereby causing the boehmite sol and the carbon to be gelled in coexistence. The gel is dried and sintered in the non-oxidizing atmosphere containing nitrogen.

(4) In the above step (2) or (3), the fine powder of the carbon source material may be more readily dispersed by suspending the fine powder in water by the use of a suitable dispersant. The resultant suspension is preferably added to the boehmite sol.

(5) In the above step (2), (3) or (4), it is preferred that at least one compound serving as a sintering agent at the time of sintering of aluminum nitride is added to the mixture of the boehmite sol and the carbon source material.

The sintered product is finally subjected to decarbonization treatment to obtain a final aluminum nitride powder.

The above procedures of the invention are described in more detail.

The boehmite or pseudo boehmite powder is first added to an aqueous medium such as water, whose pH is adjusted to a range of 1.2 to 4.5 by addition of an acid such as nitric acid, thereby permitting the boehmite sol to be optimized in dispersion state. Subsequently, a carbon fine powder or a carbon source material capable of yielding carbon fine powder at high temperatures is added to the boehmite sol and mixed. While the uniform state of the mixture is kept, it is solidified and dried. The dried mixture is sintered in a non-oxidizing atmosphere containing nitrogen at a temperature of, for example, from 1350° to 1700° C. to obtain aluminum nitride powder.

The mixing with the carbon source material is facilitated by the following procedures.

(a) The fine carbon powder is added to the boehmite sol along with water and kneaded in a suitable kneader such as a ball mill.

(b) The fine carbon powder and a suitable dispersant are added to the boehmite sol along with a suitable amount of water, and kneaded.

(c) The fine carbon powder and a suitable dispersant added to water and kneaded to obtain a good dispersion, which is mixed with the boehmite sol.

(d) A water-soluble resin is used as the carbon source material.

The dispersion of the boehmite sol and the carbon source material obtained in this manner is solidified while keeping the uniform state of the mixture.

The solidification is feasible as follows.

(a) During the kneading over a long time, the boehmite sol gradually forms a gel, so that the mixture gradually increases in viscosity and is finally solidified.

(b) While kneading, the mixture is heated to cause the water to be evaporated, thereby forming a gel.

(c) An additive such as an acid, an alkali, various ions or a polymeric coagulant is added to the mixture to facilitate the gelation.

In the practice of the invention, a sintering agent may be added to an aluminum nitride powder and uniformly dispersed in the powder. At least one compound known as an effective sintering agent for aluminum nitride, preferably a water-soluble compound such as $Y(NO_3)_3$ or the like, is added to the mixture of the boehmite sol and the carbon source material and solidified while keeping the uniform mixing state as described above.

The reason why the pH is defined in the range of from 1.2 to 4.5 during the preparation of the boehmite sol is as follows. At a pH less than 1.2, the gelation of the boehmite sol proceeds rapidly, making it almost impossible to uniformly mix it with a carbon source material. Over 4.5, the boehmite powder is not dispersed in water and remains as aggregates having a size larger than 1 micron, thus making uniform mixing with a carbon source material or the dispersion thereof.

The carbon sources useful in the present invention are preferably carbon black, graphite, or various resins capable of yielding a high carbon rate when sintered at high temperatures.

According to the method of the invention, an aluminum nitride powder having a small size and a narrow distribution in size can be reproducibly obtained in which few particles having a size larger than 1 micron are contained.

The method of the invention is completely different from known aluminum nitride preparation methods such as disclosed, for example, in Japanese Laid-open Patent Application No. 61-6105 and Japanese Patent Publication No. 61-26485 in the following respects and can produce aluminum nitride powder reproducibly.

(1) Since a highly dispersable boehmite powder has once been dispersed in water as having a size not larger than 500 angstroms with a narrow distribution in size, boehmite particles are surrounded with fine powder of a carbon source material after mixing with the fine powder.

(2) The above mixture is solidified in a uniformly mixed state, dried and sintered.

For these reasons, the growth of grains by combination of boehmite particles or formation of coarse aluminum nitride particles can be prevented according to the method of the invention.

The final aluminum nitride powder obtained by the invention can be made high in purity using a high purity of starting boehmite. For instance, it is possible to suppress a total or overall content of metal ion impurities to a level of not larger than 200 ppm. Moreover, since a fine boehmite powder and a carbon source material are mixed uniformly, impurities such as $Fe_2O_3$, $SiO_2$ and the like are readily reduced and removed by vaporization when the mixture is nitrided by reduction. Thus, the final product becomes higher in purity.

As a matter of course, the remaining carbon in the sintered product is removed by decarbonization in an oxidizing atmosphere as is known in the art. This does not require any specific techniques and is not described in detail herein.

A preferred embodiment of the invention is then described with respect to a carbon source material. In the above embodiment, carbon black, graphite or various resins capable of yielding carbon at high temperatures are used as the carbon source material. A narrower distribution in size is obtained by using, as the carbon source material, a specific combination of two types of carbon sources. This is described below.

In this embodiment, carbon obtained from a water-soluble organic carbon-containing material and a solid carbon powder are used in combination. The total carbon content relative to the boehmite powder is preferably defined in a predetermined range. More particularly, the mixing ratio by weight of the carbon from water-soluble organic carbon source material and a solid carbon powder is preferably in the range of from 0.05:1 to 0.5:1. The total carbon content is preferably controlled to be at a ratio, to the boehmite powder, of 0.4:1 to 3:1. These carbon source materials are mixed with a boehmite powder and solidified, dried and sintered in the manner as described with respect to the foregoing embodiment.

The solid carbon powder may be carbon black, graphite or the like and should preferably have a size of not larger than 5 microns. The water-soluble organic carbon source materials should not influence the dispersability of the boehmite sol and can yield a high residual carbon content at high temperatures. Examples of the materials include various water-soluble resins such as polyvinyl alcohol, polyacrylic acid, polyamide and the like, lingninsulphonic acid and the like.

The reason why the mixing ratio by weight between the carbon from a water-soluble organic carbon source and a solid carbon powder is preferably defined to be in the range of from 0.05:1 to 0.5:1 is as follows.

In order to permit the boehmite to be reduced and nitrided sufficiently, it is necessary that carbon source materials and the boehmite sol should be mixed as uniformly as possible so as to cover individual boehmite particles with the carbon particles. Otherwise, the boehmite would partially or locally remain non-nitrided by reduction as alumina or would be apt to form an irregular size of a final aluminum nitride powder.

For uniform dispersion of carbon, it is favorable to use a water-soluble organic carbon source material. However, if this type of material is used in large amounts, the bonding between carbon and carbon atoms becomes very firm during the sintering. This results in formation of very hard lumps of aluminum nitride and carbon obtained after the nitriding by reduction of the boehmite.

When the sintered product comprising aluminum nitride and carbon is decarbonized in an oxidizing atmosphere while suppressing the aluminum nitride powder from oxidation, it is important to break the lumps into pieces to an extent as fine as possible. If the lumps are too hard, the breaking operation undesirably takes a long time, during which impurities may inevitably incorporate. In addition, a residual carbon content will increase.

For these reasons, if a mixing ratio of the carbon from an organic carbon source material and a solid carbon powder is less than 0.5:1, the effect of the organic carbon source material does not become so significant. On the contrary, when the ratio exceeds 0.5:1, the lumps of aluminum nitride and carbon obtained after the sintering in a non-oxidizing atmosphere tends to become hard. Thus, the ratio is preferably in the range of from 0.05 to 0.5.

The reason why the total carbon content and the boehmite powder is preferably defined at a mixing ratio by weight of 0.4:1 to 3.0:1 is as follows.

If the mixing ratio is less than 0.4, alumina tends to remain after nitriding by reduction with a relatively large size of the aluminum nitride powder. Over 3.0, some problem may be involved in the production efficiency for the aluminum nitride powder though not vital.

As described hereinbefore, the aluminum nitride powder obtained according to the embodiments of the invention is fine in size and has a narrow distribution in size. In some cases, it has been experienced that the aluminum nitride obtained by the method involves relatively coarse particles only in a very small number. Presumably, this is because when boehmite powder is heated, it once turns into alpha-alumina, during which abnormal growth in size sometimes take place. Accordingly, even though very fine boehmite powder is used as a starting material, there is the possibility of forming coarse alpha-alumina. This is completely prevented by addition of alpha-alumina powder to the mixture of the boehmite sol and a carbon source material in the embodiments described before. The alpha-alumina is added in an amount of from 0.01 to 50 wt% of the boehmite powder used.

The alpha-alumina may be added to the mixture in the form of a powder or after preparation of an alumina slurry. It is preferred that the alumina is added after preparation of an alumina slurry having a pH of from 1.2 to 4.5, by which the alumina powder can be sufficiently dispersed.

As described above, when boehmite powder is heated for sintering, it turns into an alpha-alumina phase, during which abnormal growth of grains may take place. When a fine alpha-alumina powder is added, the added alumina serves as a nucleus-forming site when the boehmite powder is converted into alpha-alumina, thus preventing the abnormal growth.

Alumina includes not only alpha-alumina, but also meta-stable gamma-alumina. However, the meta-stable alumina has not the action as the nucleus-forming site. In addition, when gamma-alumina is converted into an alpha-alumina phase, it undergoes abnormal growth similar to the boehmite powder.

The amount of alpha-alumina is in the range of from 0.01 to 50 wt% of the boehmite powder. If the amount is less than 0.01 wt%, the number of the nucleus-forming sites are too small to suppress the abrupt growth of coarse particles involved in the conversion. Over 50 wt%, merits in use of boehmite which has good dispersability and a small size are sacrificed. The use of alpha-alumina in such large amounts would not substantially differ from known methods using alpha-alumina as a starting material.

The size of the alpha-alumina additive is not critical but is preferable to be as fine as possible. This is because the alumina powder serves as nucleus-forming sites when boehmite is converted into alpha-alumina for which a multitude of the sites should be brought into the reaction system to cause fine aluminum nitride powder to be formed. Moreover, the alpha-alumina additive itself is nitrided by reduction with the carbon and nitrogen, thereby forming an aluminum nitride powder, so that a smaller size is more favorable. If possible, the alpha-alumina additive should preferably have a smaller size than an aluminum nitride powder to be produced. The selection in size of the alpha-alumina powder permits preparation of an aluminum nitride powder having a desired size and a narrow size distribution.

The addition of the alpha-alumina additive is advantageous in that the abnormal growth is suppressed and thus a number of carbon particles are prevented from trapping in the formed alpha-alumina particles. This facilitates removal of the carbon by oxidation, thus leading to a reduced content of residual carbon in a final aluminum nitride powder product.

The present invention is more particularly described by way of examples.

EXAMPLE 1

Mixtures used to produce aluminum nitride were prepared by the following procedures (1) through (11), sintered in a nitrogen atmosphere at 1450° C. for 5 hours and decarbonized at 650° C. for 3 hours to obtain aluminum nitride powders. It will be noted that the procedures (1) to (4) are for the invention, the procedures (5) to (10) are for comparison, and the procedure (11) is for a known method.

(1) Carbon and water were added to a 20 wt% boehmite sol dispersed at a pH of 3.0 (boehmite powder/carbon ratio by weight of 1), followed by kneading in a pot mill and drying by heating.

(2) Carbon, water and a carboxylic acid dispersant were added to a 20 wt% boehmite sol dispersed at a pH of 3.0 (boehmite powder/carbon ratio by weight of 1), followed by kneading in a pot mill and drying by heating.

(3) A 20 wt% boehmite sol dispersed at a pH of 3.0 was prepared. Water and a dispersant were added to carbon and kneaded for 10 hours in a ball mill to obtain a good dispersion having a carbon content of 25%.

The boehmite sol and the carbon dispersion were kneaded in a pot mill for 10 hours, and heated while agitating to remove the water for gelation, and dried.

(4) A 20 wt% boehmite sol was prepared by dispersion at a pH of 3.0. Water and a dispersant were added to carbon, to which, prior to kneading in a pot mill, $Y(NO_3)_3 \cdot 6H_2O$ was added in an amount of 3 wt%, calculated as $Y_2O_3$, based on an aluminum nitride powder after sintering. Then, the procedure of (3) was repeated for gelation and drying.

(5) A dispersion of 20 wt% of boehmite was adjusted in pH to 1, whereupon abrupt gelation took place, making a difficulty in kneading with carbon.

(6) Carbon and water were added to 20 wt% boehmite sol dispersed at a pH of 5.0 (boehmite powder/carbon ratio by weight of 1), followed by kneading in a pot mill for 10 hours and drying by heating.

(7) The procedure (1) was repeated except that bayerite $(Al(OH)_3)$ was used instead of the boehmite.

(8) The procedure (1) was repeated except that alpha-alumina (alpha-$Al_2O_3$) having a primary particle size of about 0.3 microns was used instead of the boehmite.

(9) Carbon and water were added to an aqueous 20 wt% of solution of aluminum nitrate (aluminum hydroxide/carbon ratio by weight of 1), followed by kneading in a hot mill for 10 hours in the same manner as in (1). An aqueous ammonia solution was added to the mixture to form a neutralized precipitate of aluminum hydroxide (mainly composed of bayerite) containing the fine carbon powder and dried.

(10) Carbon was suspended in an ethanol solution of aluminum isopropoxide (aluminum hydroxide/carbon ratio by weight of 1), followed by kneading in a pot mill for 10 hours in the same manner as in (1). Water was added to the mixture for hydrolysis of the propoxide to cause precipitation of aluminum hydroxide (mainly composed of bayerite) containing the carbon fine powder, and dried.

(11) 3 wt% of $Y_2O_3$ having an average size of 1 micron was added to the aluminum nitride powder prepared in (3), followed by kneading in a pot mill for 10 hours and drying.

The size distribution of the 9 aluminum nitride powders obtained from the mixtures except for the mixture (5) among (1) to (10) is shown in FIG. 1. FIG. 1 reveals that the powders (1) to (4) of the invention have a narrow size distribution and particularly, (3) has a very narrow size distribution with an average size of 0.7 microns. The powders (6) and (7) for comparison have wide size distribution because the dispersability of the boehmite or bayerite is very poor and coarse particles are contained in large amounts. In (1) to (7), all the powders are made of an aluminum nitride single phase with a content of oxygen of not larger than 0.3 wt%. The powders from (8), (9) and (10) for comparison have the size distribution between those of (1) to (4) of the invention and (6), (7) for comparison, but alpha-alumina was found to be left in an amount of from 2 to 5 wt% after sintering.

The aluminum nitride powders obtained from (4) of the invention in which the sintering agent was uniformly dispersed in the powder and from (11) of the known method were, respectively, pelletized by press molding for comparison of sinterability. After sintering 1800° C. × 3 hours, the density of (4) was 99.3% and the density of (11) was 98.1%, with the pellets of (4) having a better appearance. The pellets of (11) were found to have a substantial degree of irregular sintering.

EXAMPLE 2

Mixtures for preparing aluminum nitride were prepared with formulation indicated in (21) to (29) of Table 1. These mixtures were each sintered in a nitrogen atmosphere at 1450° C. for 5 hours, and decarbonized at 650° C. for 3 hours to obtain an aluminum nitride powder.

The formulations (23), (24), (25) and (29) are used to indicate criticality with respect to the mixing ratio of different types of carbon sources and the total carbon content. The other formulations (21), (22), (26), (27) and (28) are usable in the practice of the invention but outside the preferable range.

All the mixtures were prepared according to the following procedure.

A 20 wt% boehmite sol dispersed at a pH of 3.0 was prepared. Separately, a dispersant and water were added to solid carbon and kneaded in a pot mill for 10 hours to obtain a dispersant of 15 wt% of carbon. The sol and the dispersion were mixed together, to which predetermined amounts of a water-soluble organic carbon source material were added. After the addition, each mixture was heated while agitating to remove the water and gelled, and dried.

Figure 2:
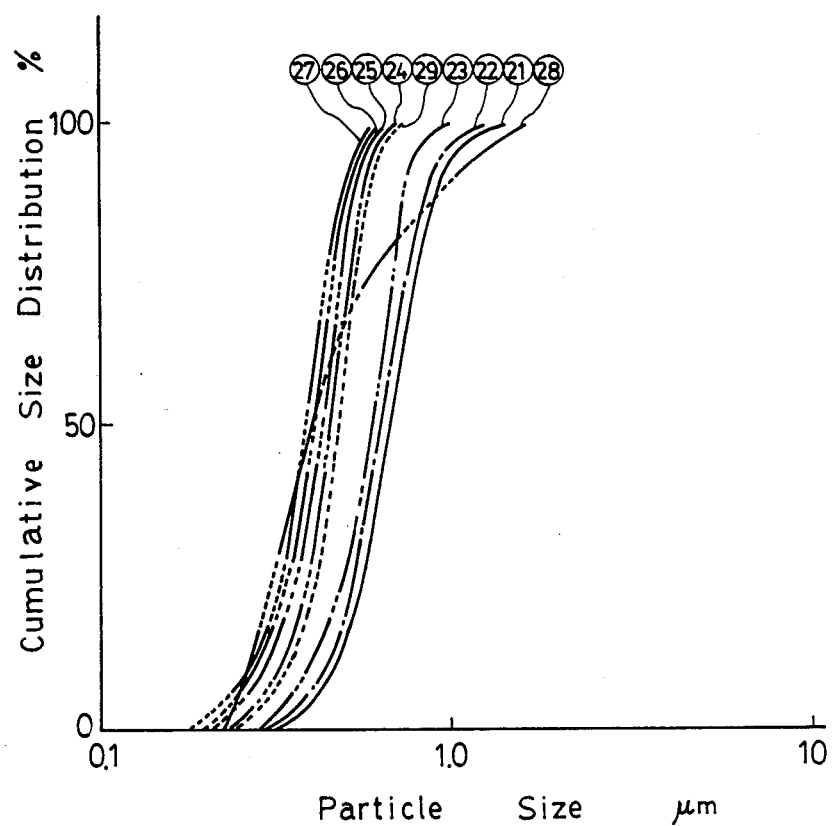
FIG. 2 is similar to FIG. 1 and shows a graph showing criticality of a preferred embodiment of the invention.

The size distribution of the results of nine aluminum nitride powders (21) to (29) is shown in FIG. 2. The contents of $Al_2O_3$ and carbon after the nitriding reaction and the decarbonization are shown in Table 2. It will be noted that numerals (21) to (29) in the figure and table, respectively, correspond to (21) to (29) in Table 1.

From FIG. 2 and Table 2, it will be seen that the nitride powders of (21) and (22) are relatively large in size and have larger contents of $Al_2O_3$ in the aluminum nitride powders than those of (23), (24), (25) and (29) according to the preferred embodiment. Further, the final aluminum nitride powders of (21) and (22) tend to suffer a larger lot-to-lot variation with respect to the size distribution and the $Al_2O_3$ content.

In contrast, the aluminum nitride powders (23), (24), (25) and (29) within a preferred mode of the invention are finer in size, narrower in size distribution, and smaller in lot-to-lot variation with reduced contents of $Al_2O_3$ and carbon.

The nitride powders (26) and (27) are somewhat inferior in nature of the lamps obtained after the nitriding reaction and are more liable to be contaminated with impurities when broken into pieces. Even when an alumina milling device is used, the content of alumina increases as will be apparent from Table 2.

With the nitride powders (26), (27), a carbon content after the decarbonization is larger.

The nitride powder (28) is inferior to the powders of the preferred embodiment with respect to the $Al_2O_3$ content and the size of the aluminum nitride powder.

From the above, it will be appreciated that the mixing ratio between the carbon derived from an organic material and a solid carbon powder is preferably in the range of from 0.05:1 to 0.5:1. With regard to the ratio between the total carbon content and the content of boehmite, it was confirmed that the ratio is preferbly in the range of 0.4:1 to 3.0:1.

TABLE 1

Mixing ratio of Carbon Derived From Organic Materials and Ratio of Total Carbon and Boehmite

| No. | 21 | 22 | 23 | 24 | 25 | 26 | 27 | 28 | 29 |
|---|---|---|---|---|---|---|---|---|---|
| Mixing Ratio By Weight of Derived Carbon and Solid Carbon Powder: | | | | | | | | | |
| | 0 | 0.03 | 0.07 | 0.20 | 0.40 | 0.60 | 0.80 | 0.20 | 0.20 |
| Ratio By Weight of Total Carbon Content and Boehmite Content: | | | | | | | | | |
| | 1.0 | 1.0 | 1.0 | 1.0 | 1.0 | 1.0 | 1.0 | 0.3 | 0.5 |

TABLE 2

Contents of $Al_2O_3$ and Carbon After Reductive Nitriding reaction and Decarbonization (wt %)

| No. | 21 | 22 | 23 | 24 | 25 | 26 | 27 | 28 | 29 |
|---|---|---|---|---|---|---|---|---|---|
| Content of Residual Alumina After Reductive Nitriding Reaction (amount relative to aluminum nitride): | | | | | | | | | |
| | 0.7 | 0.7 | 0.5 | 0.5 | 0.5 | 0.5 | 0.5 | 5.0 | 0.5 |
| Content of Residual Alumina After Decarbonization (amount relative to aluminum nitride)*: | | | | | | | | | |
| | 1.0 | 1.0 | 0.8 | 0.8 | 0.8 | 1.3 | 1.5 | 7.0 | 0.8 |
| Content of Residual Carbon After Decarbonization (amount relative to aluminum nitride)*: | | | | | | | | | |
| | 0.08 | 0.08 | 0.09 | 0.09 | 0.10 | 0.3 | 0.5 | 0.09 | 0.09 |

*Decarbonized after milling in alumina milling machine.

EXAMPLE 3

Mixtures for preparing aluminum nitride were prepared as having formulations (31) to (39) indicated in Table 3, sintered in a nitrogen atmosphere at 1600° C. for 5 hours, and decarbonized at 650° C. for 3 hours, thereby obtaining aluminum nitride powders. The content of alumina additive is varied from 0 to 100%, in which the formulations (38) and (39) are outside the range of the invention. The other formulations are within the scope of the invention although some are not in a preferred range.

The mixtures were all prepared substantially according to the following procedure.

A boehmite sol having a concentration of 20 wt% and dispersed in water at a pH of 3.0 was prepared. Separately, a dispersant and water were added to a solid carbon powder and kneaded in a pot mill for 10 hours to obtain a dispersion having a carbon content of 15 wt%.

The sol and the dispersion were mixed so that the ratio by weight of the carbon and the boehmite was 1. Thereafter, a dispersion of 10 wt% of alpha-alumina powder (having an average size of 0.3 microns) dispersed in water at a pH of 3.0 was added in a predetermined amount, followed by heating to remove the water for gelation and drying.

The test was effected under the respective conditions five times.

TABLE 3

| No. | 31 | 32 | 33 | 34 | 35 | 36 | 37 | 38 | 39 |
|---|---|---|---|---|---|---|---|---|---|
| alpha-alumina: | | | | | | | | | |
| | 0 | 0.001 | 0.02 | 0.1 | 1 | 10 | 40 | 60 | 100 |

Figure 3:
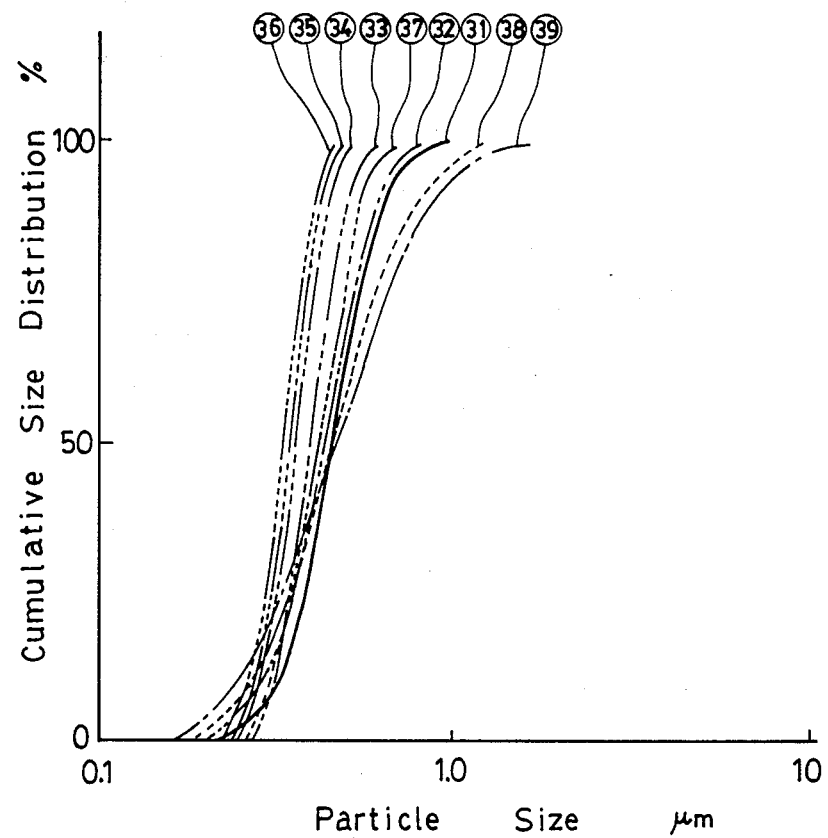
FIG. 3 is similar to FIGS. 1 and 2 and shows a graph showing criticality of another preferred embodiment of the invention using alpha-alumina powder.

The size distribution of the nine aluminum nitride powders of (31) to (39) is shown in FIG. 3. From the figure and through scanning electron microscopic observation, it was confirmed that the nitride powders of (31), (32), (38) and (39) are wide in size distribution with a relatively large average particle size and that particles abnormally grown up to a size not less than 5 microns are found especially in (39) and (39).

With the nitride powders obtained from (33), (34), (35), (36) and (37), the particle size is smaller with a narrower size distribution. No abnormally grown particles were found with a small scattering in size between test lots.

In view of the above results, the content of alpha-alumina is preferably in the range of from 0.01 to 50 wt% based of the boehmite powder although less amounts are usable in the practice of the invention. However, larger amounts are not within the scope of the invention for the reasons stated hereinbefore.

The aluminum nitride powders obtained according to the invention has specific utility in the field of high temperature structural materials and IC boards.

What is claimed is:

1. A method for producing aluminum nitride powder which comprises adding a boehmite powder to an aqueous medium, adjusting the resulting dispersion to a pH of 1.2 to 4.5 to obtain a boehmite sol, mixing the boehmite sol with a carbon source material, drying the mixture, sintering the dried mixture in a non-oxidizing atmosphere containing a nitrogen gas, and decarbonizing the sintered product to obtain an aluminum nitride powder.

2. A method for producing an aluminum nitride powder according to claim 1, wherein said carbon source material is mixed with the boehmite sol after dispersion in an aqueous medium.

3. A method for producing an aluminum nitride powder according to claim 1, wherein, prior to the drying, the mixtures is solidified in a uniformly mixed state and gelled.

4. A method for producing an aluminum nitride powder according to claim 1, wherein a sintering agent is added to the boehmite sol, the carbon dispersion or the mixture thereof.

5. A method for producing an aluminum nitride powder according to claim 1, further comprising adding from 0.01 to 50 wt% of alpha-alumina powder to the mixture of said boehmite sol and the carbon source material.

6. A method for producing an aluminum nitride powder according to claim 1, wherein said carbon source material is a mixture of an organic carbon source material and a solid carbon powder.

7. A method for producing an aluminum nitride powder according to claim 6, wherein a mixing ratio by weight of the carbon derived from said organic carbon source material to the solid carbon powder is in the range of from 0.05:1 to 0.5:1.

8. A method for producing an aluminum nitride powder according to claim 6, wherein a ratio by weight of the total amount of the carbon derived from said organic carbon source material and the solid carbon powder to the boehmite powder is in the range of from 0.4:1 to 3.0:1.

9. A method for producing an aluminum nitride powder according to claim 6, wherein the solid carbon powder has a size of not larger than 0.5 microns.

10. A method for producing an aluminum nitride powder according to claim 6, further comprising adding from 0.01 to 50 wt% of alpha-alumina powder, based on the boehmite powder, to the mixture of the boehmite sol and the carbon source material.

* * * * *